United States Patent
Reiser et al.

(10) Patent No.: US 9,199,540 B2
(45) Date of Patent: Dec. 1, 2015

(54) CURRENT COLLECTOR STRIP FOR A SLIDING CONTACT DEVICE

(75) Inventors: Klaus Reiser, Bad Ischl (AT); Johann Angerer, Bad Goisern (AT); Martin Ganzel, Bad Ischl (AT)

(73) Assignee: HOFFMANN & CO. ELEKTROKOHLE AG, Bad Goisern (AT)

( * ) Notice: Subject to any disclaimer, the term of this patent is extended or adjusted under 35 U.S.C. 154(b) by 301 days.

(21) Appl. No.: 13/877,565

(22) PCT Filed: Sep. 28, 2011

(86) PCT No.: PCT/EP2011/066904
§ 371 (c)(1),
(2), (4) Date: May 7, 2013

(87) PCT Pub. No.: WO2012/045633
PCT Pub. Date: Apr. 12, 2012

(65) Prior Publication Data
US 2013/0220757 A1 Aug. 29, 2013

(30) Foreign Application Priority Data
Oct. 6, 2010 (DE) .......................... 10 2010 042 027

(51) Int. Cl.
*B60L 5/00* (2006.01)
*B60L 5/20* (2006.01)

(52) U.S. Cl.
CPC . *B60L 5/20* (2013.01); *B60L 5/205* (2013.01); *B60L 2200/26* (2013.01)

(58) Field of Classification Search
CPC ............. B60L 5/20; B60L 5/205; B60L 5/22; B60L 5/24; B60L 5/26; B60L 5/28
See application file for complete search history.

(56) References Cited

U.S. PATENT DOCUMENTS 2,636,856 A * 4/1953 Suggs et al. ............. 204/290.03
3,730,312 A * 5/1973 Leger .............................. 191/66
(Continued)

FOREIGN PATENT DOCUMENTS

CN 2139539 Y 8/1993
CN 1259911 A 7/2000
(Continued)

OTHER PUBLICATIONS

English Translation of the International Preliminary Report on Patentability, PCT/EP2011/066904, May 16, 2013.
(Continued)

*Primary Examiner* — Jason C Smith
(74) *Attorney, Agent, or Firm* — Quarles & Brady LLP (57) ABSTRACT

The invention relates to a current collector strip (12) for a sliding contact device (10) which bears in a prestressed fashion against a contact wire (16), in particular in order to supply current to rail vehicles, having a sliding strip (14) which is arranged on a sliding strip carrier (13) and which has a carbon molding (18) and at least one metallic conducting device (23) which is arranged in the carbon molding and has the purpose of bringing about locally increased conductivity, wherein the conducting device is formed as at least one disc-shaped conducting device which extends transversely to a sliding direction (19) and in the direction of a prestressing force in a plane and which is connected to the sliding strip carrier and extends in a slot (22), formed in the carbon molding, as far as to a contact surface (21) of the sliding strip.

15 Claims, 6 Drawing Sheets

(56) References Cited

U.S. PATENT DOCUMENTS

| | | | | |
|---|---|---|---|---|
| 4,471,175 | A | * | 9/1984 | Gronlund ........................ 191/66 |
| 5,193,656 | A | * | 3/1993 | Hoffmann et al. ............... 191/49 |
| 2007/0072440 | A1 | * | 3/2007 | Spacie et al. ...................... 439/1 |
| 2013/0048458 | A1 | * | 2/2013 | Rastl et al. ................... 191/59.1 |
| 2013/0220757 | A1 | * | 8/2013 | Reiser et al. ................ 191/45 R |
| 2013/0256073 | A1 | * | 10/2013 | Yamada et al. .............. 191/60.2 |
| 2014/0202816 | A1 | * | 7/2014 | Kuo et al. .................... 191/59.1 |
| 2014/0305924 | A1 | * | 10/2014 | Uchtmann .................... 219/202 |
| 2014/0338558 | A1 | * | 11/2014 | Luebben et al. ............... 105/1.4 |

FOREIGN PATENT DOCUMENTS

| | | |
|---|---|---|
| DE | 93 16 425 U1 | 1/1994 |
| DE | 43 26 614 A1 | 2/1995 |
| DE | 44 41 339 A1 | 5/1996 |
| EP | 1844972 A1 | 10/2007 |
| FR | 1 110 518 A | 2/1956 |
| GB | 148 529 A | 11/1921 |
| JP | H0249301 U | 4/1990 |
| JP | H05244703 A | 9/1993 |
| JP | 2004194371 A | 7/2004 |

OTHER PUBLICATIONS

The International Search Report as mailed on Jan. 23, 2013 for International Application No. PCT/EP2011/066904.

Japan Patent Office, Notice of Reasons for Rejection, Application No. 2013-532129, Feb. 24, 2015, 5 pages [English Language Translation Only].

State Intellectual Property Office of People's Republic of China, First Office Action and Search Report, Application No. 201180048569.X, Dec. 16, 2014, 10 pages [English Language Translation Only].

* cited by examiner

CURRENT COLLECTOR STRIP FOR A SLIDING CONTACT DEVICE

CROSS-REFERENCE TO RELATED APPLICATIONS

This application represents the national stage entry of PCT International Application No. PCT/EP2011/066904 filed Sep. 28, 2011 and claims the benefit of German Application No. 10 2010 042 027.1 filed Oct. 6, 2010. The contents of both of these applications are hereby incorporated by reference as if set forth in their entirety herein.

The present invention relates to a current collector strip for a sliding contact device which bears in a prestressed fashion against a contact wire, in particular in order to supply current to rail vehicles, having a sliding strip which is arranged on a sliding strip carrier and which has a carbon molding and at least one metallic conducting device which is arranged in the carbon molding and has the purpose of bringing about locally increased conductivity.

For supplying current to rail-bound vehicles driven by electric motor, sliding contact devices are used which in technical terms are also called pantographs and are provided with a sliding strip which, as a wear part, is pressed against a traction current line (contact wire) by means of a prestressing force generated by the pantograph and allows supplying current during operation of the vehicle by means of a sliding contact.

In order to make it possible to maintain the sliding contact between the sliding strip and the contact wire as continuously as possible during dynamic operation of such rail-bound vehicles as well, it is known to be advantageous to keep the mass inertia forces of the pantograph as low as possible, which forces are substantially influenced by, among other things, the mass of the current collector strip. For an effective operation of the vehicles driven by electric motors, it is necessary at the same time to provide a sufficient electrical conductivity, respectively a low electrical resistance of the sliding strip. For this reason, a metal impregnation of the porous carbon has proven to be unsatisfactory because a thereby achieved good electrical conductivity is accompanied by an in itself undesired increase in the measurements of the sliding strip due to the metal content formed in the sliding strip by impregnation.

Assuming this state of the art, it was therefore previously proposed in EP 1 491 385 A1 to take measures which make it possible to realize a low specific electrical resistance of the sliding strip, i.e. a good electrical conductivity, while, at the same time, keeping density as low as possible, i.e. maintaining an accordingly low mass of the sliding strip.

As a solution for this, it is proposed in EP 1 491 385 A1 to produce sliding strips based on a material composite which has a layer structure of carbon layers between which metallic woven grids are arranged, respectively, which extend in a plane transverse to the sliding direction of the sliding strip and in the direction of the prestressing force acting through the sliding contact device on the sliding strip.

Due to the afore-described layer structure of the known sliding strip, production of this sliding strip proves relatively elaborate because, first, individual carbon layers must be produced, then the afore-mentioned layered structure must be established by arranging the woven grids between the individual carbon layers and only then, a composite body or carbon molding can be produced which, as a whole, forms the sliding strip.

It is therefore the object of the present invention to propose a sliding strip as well as a method for producing a sliding strip which method allows for a simplified production of a sliding strip.

To solve this object, the current collector strip carries the features of claim 1.

In the current collector strip according to the invention, the conducting device is formed as at least one disc-shaped conducting device which extends transversally to the sliding direction and in the direction of a prestressing force in a plane and which is connected to the sliding strip carrier and extends in a slot, formed in the carbon molding, as far as to a contact surface of the sliding strip.

Due to the design of the current collector strip according to the invention, it is possible to produce the sliding strip on the basis of an integrally formed carbon molding in which a conducting device formed independent of the carbon molding is provided, the conducting device being formed disc-shaped and extending, starting from the sliding strip carrier, in a slot of the carbon molding. Due to the connection of the disc-shaped conducting device to the sliding strip carrier, the carbon molding can be produced independently from the conducting device as a monolithic body. The formation of the current collector strip takes place in a simple manner by inserting the disc-shaped conducting device into the slot provided for it in the carbon molding.

In this manner, the disc-shaped conducting device does not only make possible the desired locally increased electrical conductivity in the carbon molding, but also serves for the shear-resistant arrangement of the carbon molding on the sliding strip carrier.

Contrary to the current collector strip known from the state of the art, thus, a sliding strip can be used which can be produced without creating a layered composite. Instead, the spatially defined arrangement of the conducting device is realized alone by the described arrangement of the disc-shaped conducting device in the at least one slot of the carbon molding.

It is particularly advantageous if the conducting device is formed as a component which is combinable with the sliding strip carrier and which comprises a connecting portion for the connection to the sliding strip carrier and a disc portion for accommodation in the slot formed in the carbon molding. Thereby it is possible to form the conducting device independently from the carbon molding and also independently form the sliding strip carrier in order to thus be able to use, for example, uniformly formed sliding strip carriers by combination with variably formed conducting devices and carbon moldings so as to produce different current collector strips. Thus, for example, a sliding strip carrier formed in a standardized manner can be used as a platform for differently formed current collector strips.

If, according to a preferred embodiment, the connecting portion comprises a mounting stop extending parallel to a lower side of the sliding strip carrier and abutting against the lower side, and the disc portion adjacent thereto extends through a mounting slot in the sliding strip carrier into the slot formed by the carbon molding, then the disc portion is exactly defined in a simple manner in its relative arrangement towards the sliding strip carrier. Furthermore, the mounting stop abutting against the lower side simultaneously offers the option to use the mounting stop to attach the disc portion to the sliding strip carrier without thereby influencing the geometry or the cross-section of the disc portion. Thus, it becomes possible to form the disc portion in such a manner that its geometry exactly corresponds to the slot without the geometry being impaired by the type of attachment. Thus, it is possible to constantly define the electrical conducting properties and the electrical resistance of the disc portion across its entire height, respectively across the entire height of the carbon molding.

If the connecting portion of the conducting device further comprises an engagement portion which is arranged parallel to the disc portion and spaced from the disc portion by the mounting stop and which serves the purpose of engaging in a locking manner a locking slot formed on the lower side of the sliding strip carrier, then a particularly exact relative arrangement of the conducting device relative of the sliding strip carrier is ensured, which arrangement avoids faulty positioning.

Advantageously, a direct connection of the mounting stop to the sliding strip carrier takes place for the connection of the conducting device to to the sliding strip carrier, for example by means of a welding joint or solder joint.

It has proven particularly advantageous on the one hand, with respect to the desired mechanical properties of the current collector strip and, on the other hand, with respect to the desired good electrical conducting properties, if the conducting device and the sliding strip carrier are formed from different materials. In this case, a particularly advantageous option is to form the conducting device from sheet copper.

In order to achieve an evenly spread arrangement of a multitude of conducting devices in the carbon molding, it proves advantageous if the conducting devices are arranged in parallel lines along a longitudinal axis of the sliding strip in parallel lines, wherein the disc portions of two consecutive conducting devices are arranged on different sides of the longitudinal axis of the sliding strip carrier, respectively.

Alternatively to the afore-described embodiment of the current collector strip having a conducting device formed independently from the sliding strip carrier, there is also the advantageous option of forming the conducting device integrally connected to the sliding strip carrier so that the sliding strip carrier can be produced together with the conducting device in a joint production process.

A particularly advantageous option of jointly producing the conducting device and the sliding strip carrier in a composite arises if the conducting device is formed by at least one profile web of a carrier profile of the sliding strip carrier so that, for example, the conducting device can be produced integrally connected to the sliding strip carrier in a continuous casting process.

For establishing an evenly spaced-out arrangement of a multitude of conducting devices on the sliding strip carrier, it proves particularly advantageous if the sliding strip carrier has an in-line arrangement of conducting devices with multiple conducting devices arranged in at least two parallel lines, wherein in particular each line can comprise at least two spaced-apart conducting devices.

If the conducting devices arranged in neighboring lines are arranged offset to one another in the direction of the longitudinal axis of the sliding strip carrier, an even spacing of the conducting devices across the entire contact surface of the sliding strip is possible.

In the following, preferred embodiments of the current collector strip will be explained in more detail with reference to the drawings.

Figure 1:
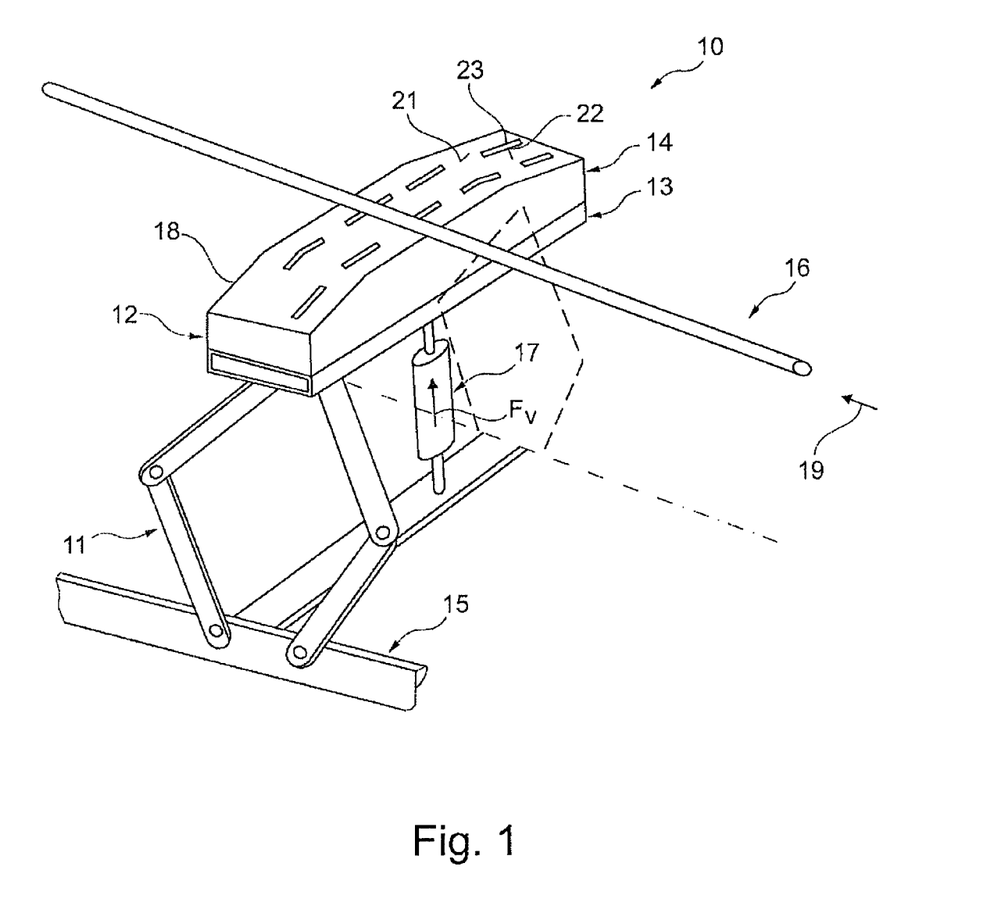
FIG. 1 shows a sliding contact device provided with a current collector strip in an isometric illustration.

FIG. 1 shows a sliding contact device 10 having a current collector strip 12 arranged on a joint device 11. For the arrangement and connection with the joint device 11, the current collector strip 12 comprises a sliding strip carrier 13 which is fitted with a sliding strip 14. The joint device 11 connects the current collector strip 12 to a mounting base 15, which can be arranged, for example, on a railcar of a rail vehicle not illustrated here. For generating a prestressing force by which the current collector strip 12, respectively the sliding strip 14, can be elastically pressed against a contact wire 16 guided longitudinally above the sliding strip 14, the sliding contact device 10 comprises a press-on device 17 which is realized here as a combined spring/damper device and which is effective between the mounting base 15 and the sliding strip carrier 13.

The sliding strip 14 illustrated in FIG. 1 comprises a carbon molding 18 which has slots 22 that extend transversally to a sliding direction 19, defined by the longitudinal extension of the contact wire 16, and in the direction of a prestressing force $F_V$, acting on the sliding strip 14 due to the press-on device 17, and which extend from the sliding strip carrier 13 through the carbon molding 18 as far as to a contact surface 21 of the sliding strip 14. In the slots 22, respectively one conducting device 23 formed from a metallic material extends also starting from the sliding strip carrier 13 as far as into the contact surface 21 of the sliding strip 14.

Figure 2:
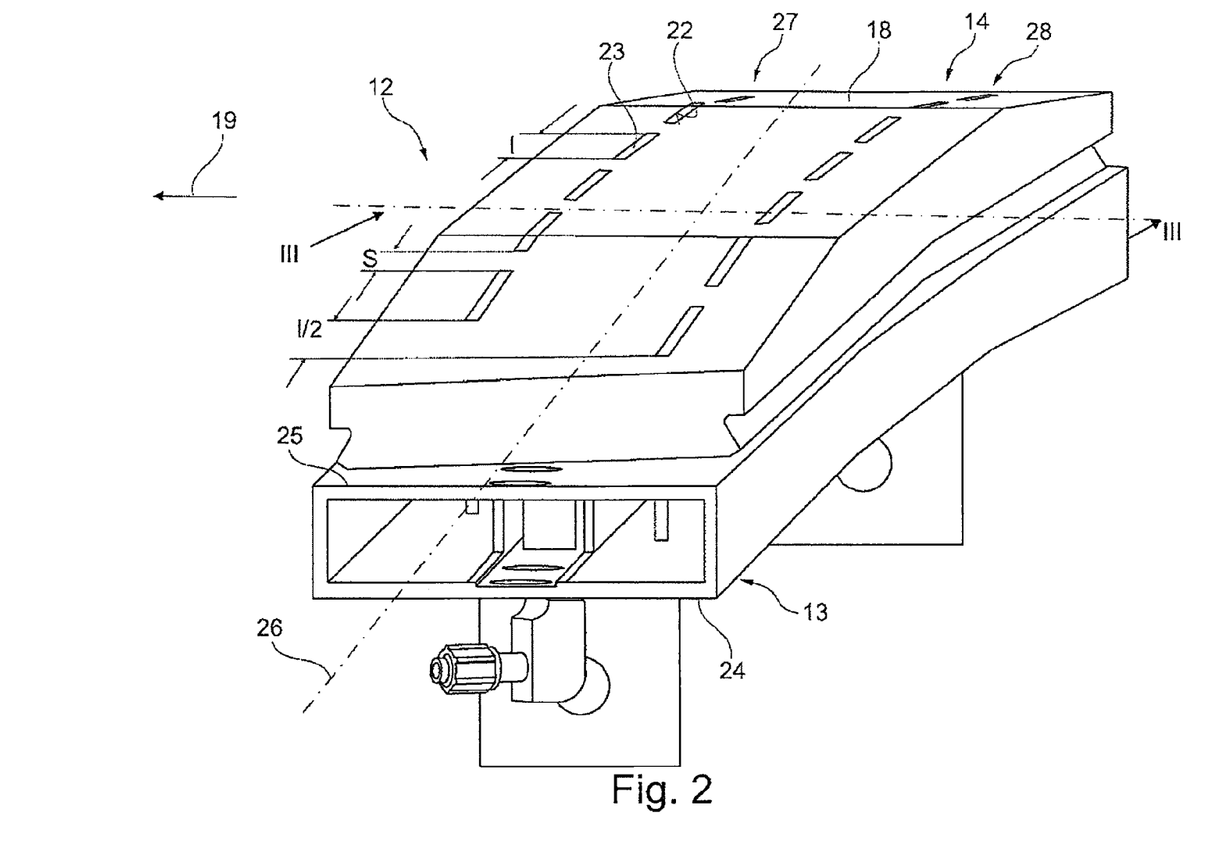
FIG. 2 shows a first embodiment of a current collector strip embodied according to FIG. 1 as a component of the sliding contact device in an isometric illustration.

As it can be taken in particular from FIG. 2, the sliding strip carrier 13 has a box profile 24 with an upper carrier surface 25, on which the sliding strip 14 is arranged. The sliding strip 14 consists of the carbon molding 18 in which on both sides of a central longitudinal axis 26 the slots 22 are arranged equidistantly with a slot distance s, respectively. The slot distance s is chosen such that it is smaller than the slot length l. As it can further be taken from FIG. 2, the slots 22 are arranged in two slot lines 27, 28 on both sides of the longitudinal axis 26 and parallel to the axis, respectively. The slot lines 27, 28 are offset to each other in the direction of the longitudinal axis 26 by about half the slot length ½ so that in the sliding direction 19; an overlapping of the slot distances s of the slot line 28 by the slots 22 of the neighboring slot line 27 occurs. This result in a steady and reliable electrically conductive contact between the contact wire 16 and at least one of the conducting devices 23 arranged in the slots 22 of the slot lines 27 and 28, independent of—i.e. also deviating from—a relative orientation, illustrated in FIG. 1, of the contact wire 16 relative to a contact surface 21 of the sliding strip 14.

Figure 3:
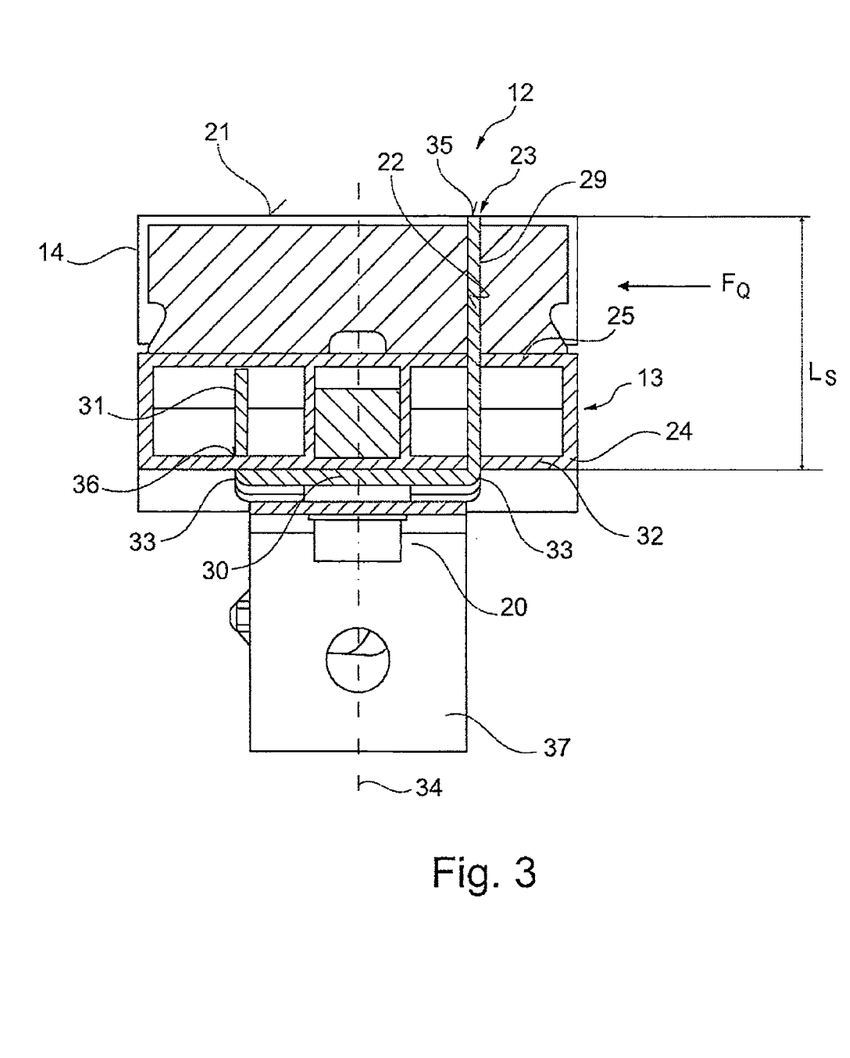
FIG. 3 shows the current collector strip of FIG. 2 in a sectional illustration according to the sectional line in FIG. 2.

As FIG. 3 shows, in the illustrated embodiment of the current collector strip 12, the conducting devices 23 are formed independently from the sliding strip carrier 13 and connected in a form-fitting and force-fitting manner to the box profile 24 of the sliding strip carrier 13. For this purpose, the conducting devices 23 in the illustrated embodiment each have a disc portion 29 which is connected via a mounting stop 30 to an engagement portion 31. The above-mentioned portions form a substantially U-shaped relative arrangement. For connecting the conducting devices 23 to the box profile 24, the disc portion 29 of each conducting device 23 extends through mounting slots 32, 33, formed in the carrier surface 25 as well as in a mounting surface 32 of the box profile 24, and through the slot 22 arranged aligned thereto in the sliding strip 14. The length $L_S$ of the disc portion 29 is measured such that when the mounting stop 30 stops against the mounting surface 32, a contact edge 35 of the conducting device 23 is arranged flush in the contact surface 21 of the sliding strip 14. On the mounting stop 30 edge arranged opposite of the disc portion 29, the engagement portion 31 of the conducting device 23 engages a locking slot 36 formed parallel to the mounting slot 33 in the mounting surface 32 so that the conducting device 23 is connected secured in its position to the box profile 24 of the sliding strip carrier 13.

Due to the mounting stop 30, a defined vertical positioning is achieved and due to the disc portion 29, in combination with the engagement portion 31, engaging the box profile, a particularly exact and secure rotatory, angle positioning relative to a vertical axis 34 is achieved. As can be taken in particular from the illustration in FIG. 3, the arrangement of the disc portion 29 penetrating the carbon molding 18 as illustrated also allows a secure transfer of the transversal forces $F_Q$, acting on the sliding strip 14 as a result of the sliding contact between the contact wire 16 and the sliding strip 14, into the sliding strip carrier 13 so that substantially no thrust load occurs in the border surface between the sliding strip 14 and the carrier surface 25 of the box profile 24.

As FIG. 3 shows, on the basis of the above-described form fit between the disc portion 29 and the engagement portion 31 with the box profile 24 of the sliding strip carrier 13, for securing a corresponding force fit it is sufficient to secure the relative position, shown in FIG. 3, of the mounting stop 30 abutting against the mounting surface 32 of the box profile 24 by a screw connection 20. The screw connection 20 itself stays substantially free of load. At the same time, the screw connection 20 can serve for the connection of a connecting element 37 for the connection to the joint device 11 illustrated in FIG. 1.

Figure 4:
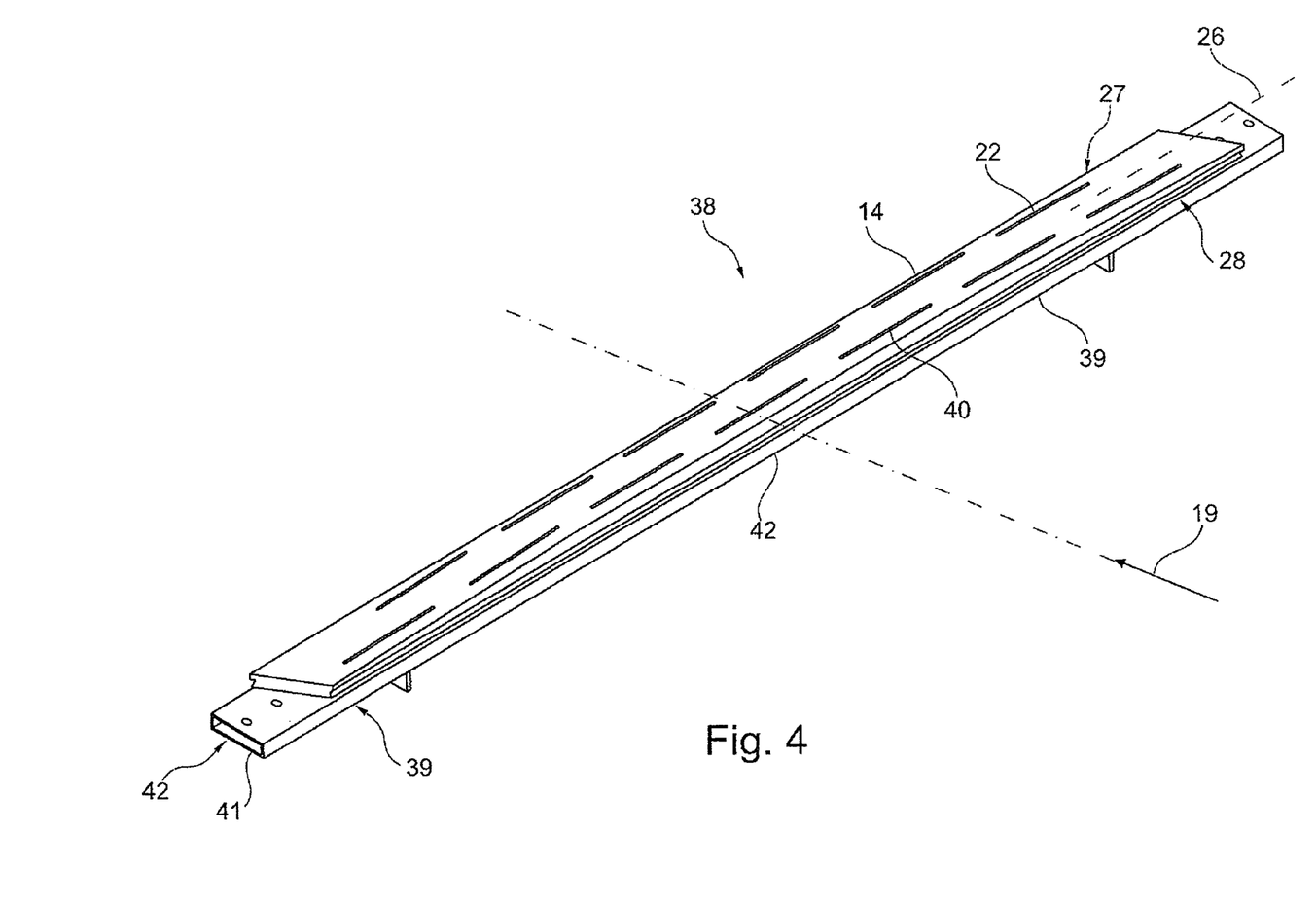
FIG. 4 shows a current collector strip formed as a component of a sliding contact device according to the illustration in FIG. 1 in a second embodiment in an isometric illustration.

FIG. 4 shows in a further embodiment a current collector strip 38 which has a sliding strip 14 in correspondence to the one previously described with reference to FIGS. 1 and 3, which is provided with slots 22 in two slot lines 27 and 28 parallel to each other and to the longitudinal axis 26.

In deviation from the current collector strip 12, the current collector strip 38 comprises a sliding strip carrier 39 which is provided with conducting devices 40 which are integrally connected to a carrier profile 42 of the sliding strip carrier 39, the carrier profile having a box profile cross section 41.

Figure 5:
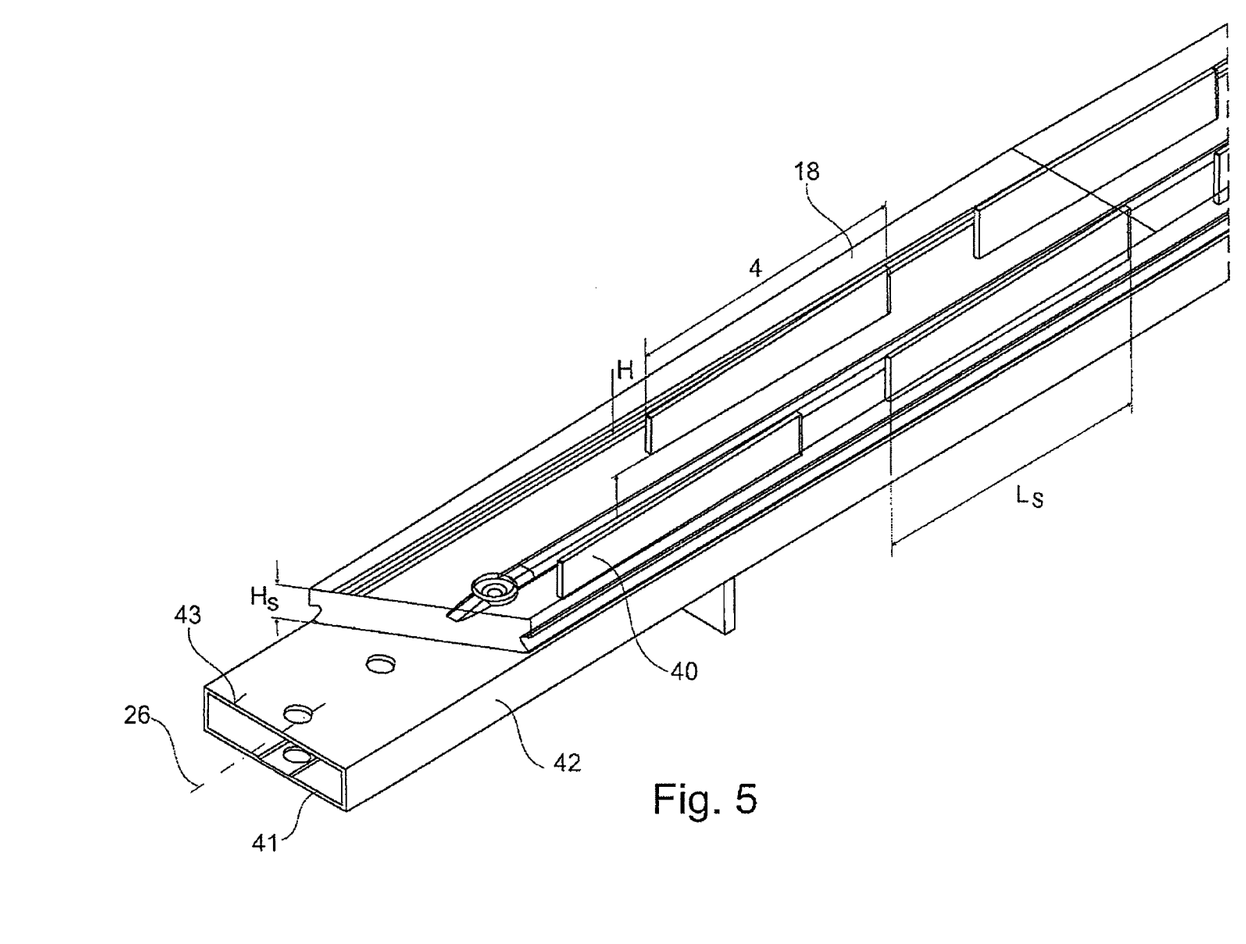
FIG. 5 shows a partial illustration of the current collector strip illustrated in FIG. 4.
Figure 6:
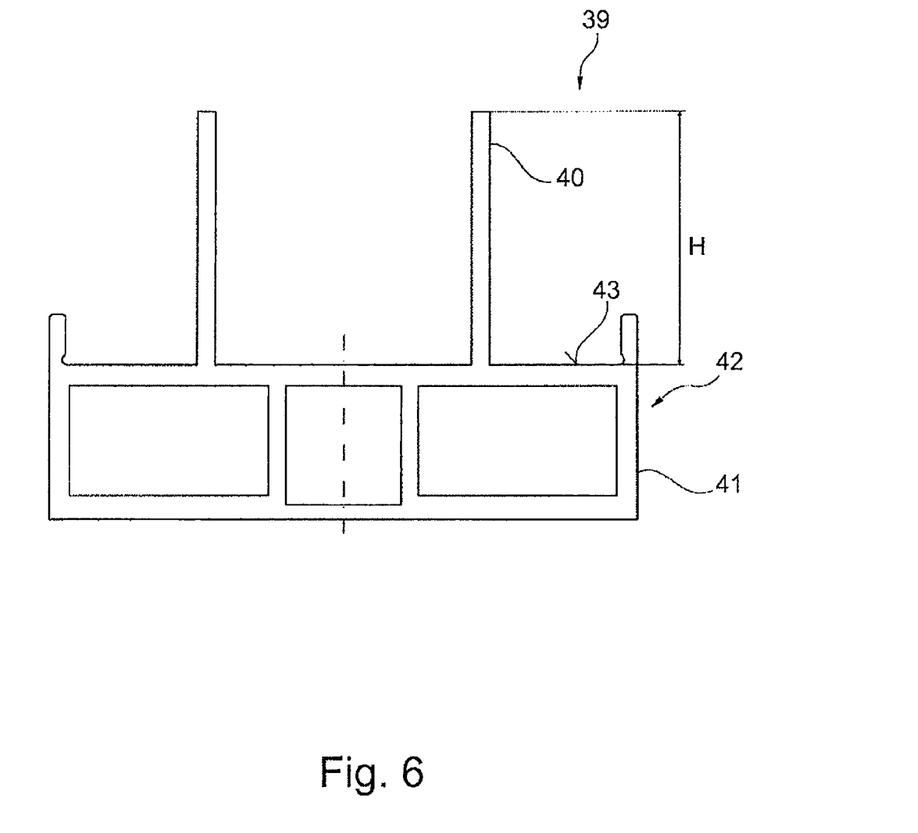
FIG. 6 shows a lateral view of the sliding strip carrier used with the current collector strips according to FIG. 4 and FIG. 5.

For this purpose, as can be taken in particular form FIGS. 5 and 6, the carrier profile 42 comprises profile webs which are formed as conducting devices 40 and which are formed onto a carrier surface 43 of the carrier profile 42, here formed as a box profile, and have a height H which corresponds to the height $H_S$ of the slots 22 formed in the carbon molding 18. Further, the conducting devices 40 formed as profile webs correspond in their length L in the direction of the longitudinal axis 26 of the sliding strip 14 to the length $L_S$ of the slots 22 and, in their arrangement on the carrier surface 43 of the carrier profile 42, they are oriented corresponding to the slot lines 27, 28 in the sliding strip so that across the entire length of the sliding strip 14, a form-fitting engagement of the conducting devices 40 into the slots 22 of the sliding strip 14 occurs.

As a comparison of the two embodiments of the invention illustrated in FIGS. 1 to 3 and 4 to 6 shows, for the current collector strip 38 illustrated in FIGS. 4 to 6, a mechanical connection is realized between the sliding strip 14 and the sliding strip carrier 39, which connection, in the same manner as the extensively described mechanical connection between the conducting devices 23, respectively between the disc portion 29 of the conducting devices 23, and the sliding strip 14, provides for the formation a border surface between the sliding strip 14 and the carrier surface 43 of the sliding strip carrier 39, which border surface is substantially free of shear loads or thrust loads.

The invention claimed is:

1. A current collector strip for a sliding contact device biased against a contact wire, said collector strip comprising:
 a sliding strip arranged on a sliding strip carrier, and having a contact surface and a monolithic carbon molding arranged on said sliding strip carrier to form a sliding strip, said monolithic carbon molding including at least one slot extending through said monolithic carbon molding and opening onto the contact surface; and
 at least one metallic conducting device formed independently of the monolithic carbon molding, connected to the sliding strip carrier, and extending through said at least one slot formed in the monolithic carbon molding to the contact surface of the sliding strip, the at least one metallic conducting device extending transversely to a sliding direction and in a direction of a biasing force.

2. The current collector strip according to claim 1, in which the at least one conducting device is combined with the sliding strip carrier and has a connecting portion connecting the sliding strip carrier and a portion of the at least one conducting device for the mounting in the slot formed in the carbon molding.

3. The current collector strip according to claim 2, in which the connecting portion has a mounting stop extending parallel to a lower side of the sliding strip carrier and abutting against the lower side, and the portion of the at least one conducting device adjacent thereto extends though a mounting slot in the sliding strip carrier into the slot formed in the carbon molding.

4. The current collector strip according to claim 3, in which the connecting portion of the at least one conducting device has an engagement portion arranged parallel to the portion of the at least one conducting device and spaced from the portion of the at least one conducting device by the mounting stop, the engagement portion engaging in a locking manner a locking slot formed on the lower side of the sliding strip carrier.

5. The current collector strip according to claim 3, in which, the mounting stop is connected to the sliding strip carrier connecting the at least one conductor device to the sliding strip carrier.

6. The current collector strip according to claim 1, in which the at least one conducting device and the sliding strip carrier are formed from different materials.

7. The current collector strip according to claim 6, in which the at least one conducting device is made of sheet copper.

8. The current collector strip according to claim 1, in which the sliding strip carrier includes a multitude of conducting devices arranged along a longitudinal axis of the sliding strip carrier in parallel lines, wherein portions of two consecutive conducting devices are arranged on different sides of the longitudinal axis of the sliding strip carrier, respectively.

9. The current collector strip according to claim 8, in which the conducting devices arranged in neighboring lines are arranged offset to each other in the direction of the longitudinal axis of the sliding strip carrier.

10. The current collector strip according to claim 1, in which the at least one conducting device is integrally connected on the sliding strip carrier.

11. The current collector strip according to claim 10, in which the at least one conducting device is at least one profile web of a carrier profile of the sliding strip carrier.

12. The current collector strip according to claim 10, in which the sliding strip carrier has an in-line arrangement of conducting devices with multiple conducting devices arranged in at least two parallel lines.

13. The current collector strip according to claim 12, in which each line has at least two spaced-apart conducting devices.

14. The current collector strip according to claim 13, in which the conducting devices arranged in neighboring lines are arranged offset to each other in the direction of the longitudinal axis of the sliding strip carrier.

15. The current collector strip according to claim 1, in which the at least one conducting device is disc-shaped.

\* \* \* \* \*